Oct. 28, 1947.　　　J. M. ROACHELL　　　2,429,731
GRIP EXTENSION FOR HANDLES
Filed July 2, 1946

*INVENTOR.*
JAMES M. ROACHELL
BY *Victor J. Evans & Co.*
ATTORNEYS

Patented Oct. 28, 1947

2,429,731

UNITED STATES PATENT OFFICE 2,429,731

GRIP EXTENSION FOR HANDLES

James M. Roachell, Honolulu, Territory of Hawaii

Application July 2, 1946, Serial No. 680,876

3 Claims. (Cl. 74—543)

My present invention relates to an improved grip extension for handles and more particularly to a handle extension and grip for automobile gear shift levers of the type mounted on and adjacent the steering wheel thereof.

The principal object of my invention is to present a handle extension for such gear shift levers wherein by the use of my extension, the operator may simultaneously shift the gears with the right hand while maintaining adequate steering wheel control with the same hand.

The handle of my invention is so designed and constructed that one-hand operation of the automobile is possible and is especially beneficial for those persons having lost an arm or hand and who still find it necessary to drive an automobile.

In the accompanying drawings I have illustrated one complete example of the physical embodiment of my invention according to the best mode I have thus far devised but it will be understood that various changes and alterations may be made therein within the scope and spirit of the appended claims.

Figure 1:
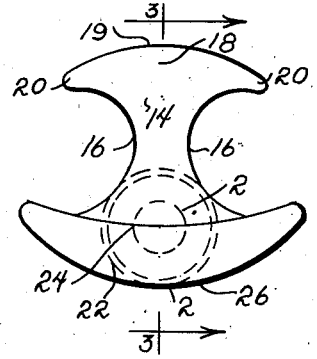
Figure 1 is a front elevational view of the handle of my invention.
Figure 2:
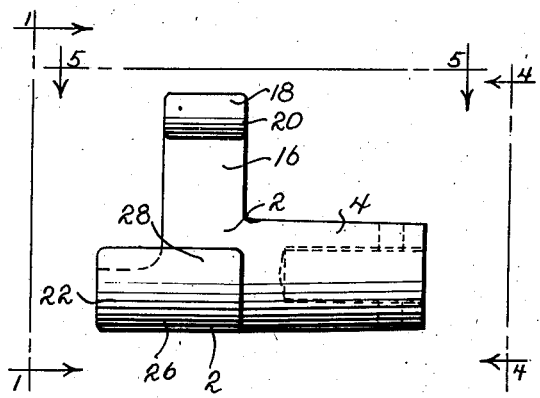
Figure 2 is a side elevational view thereof.
Figure 3:
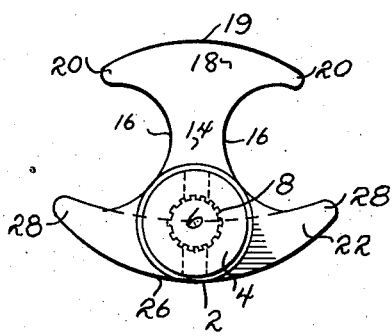
Figure 3 is an end elevational view.
Figure 4:
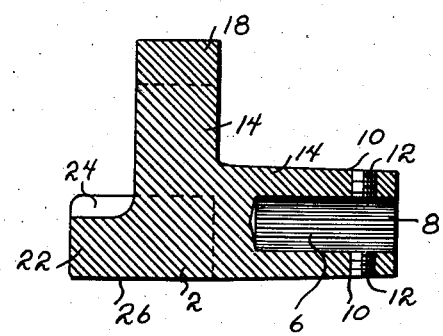
Figure 4 is a vertical cross-sectional view taken on line 3—3 of Figure 1.
Figure 5:
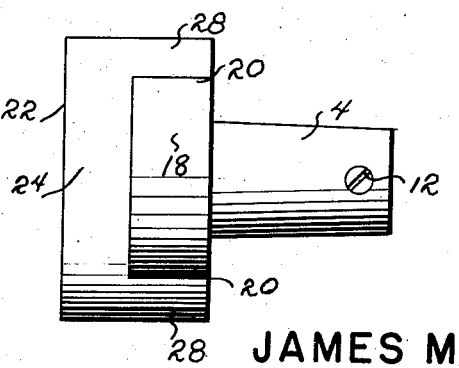
Figure 5 is a top plan view.

Referring now to the drawings in detail wherein like characters indicate like parts, I have illustrated the handle of my invention comprising a base 2 formed with a shank 4. The shank is drilled to form a hole 6 splined as at 8 and the splined opening is provided for mounting on the conventional gear shift lever of the steering wheel type. Set screws 10 in the threaded holes 12 therefor secure the shank on the lever (not shown).

Above the base 2 I have fashioned the upright portion 14 having inwardly curved side walls 16 and formed with a top cross bar 18. The cross bar 18 has a curved upper surface 19 and terminates at its ends in reduced overhanging portions 22.

Forward of the base 2, I utilize an extended portion 22 having a concave top surface 24 and a convex bottom surface 26, and the extended portion follows around the side of the base 2 as at 28.

When the handle is mounted upon the conventional gear shift lever on the steering column of a vehicle, the shank 4 will be under and will extend slightly beyond the steering wheel ring, and the upright portion 14 will extend above the ring to a limited extent.

Thus while the thumb and one or two fingers of the right hand are controlling the steering wheel, the other fingers may engage the handle of my invention to shift the gears. The finger tips of the free fingers not engaging the steering wheel may be slipped under the overhanging portions 20 depending upon the movement of the gear shift lever, whether forward or backward, and the necessary depressing or elevating motion may be imparted through the upright member 14.

By the use of the handle of my invention a person having only one hand or one arm, may efficiently and easily control the steering and may also shift the gear without actually removing the hand from the steering wheel.

Having thus fully described my invention what I claim as new and desire to secure by Letters Patent is:

1. A handle and grip including a base formed for mounting upon a gear shift lever, an upright on the base and formed with inwardly curved side walls, and a cross bar extending transversely and upwardly from the upright, the overhanging ends of said cross bar merging with the curved wells of the upright and the under surfaces of the ends being curved into the curved side walls of the upright and extending thereover and in continuation of the curved upright side walls, the cross bar lying in the same vertical plane with the upright.

2. A handle and grip including a base formed for mounting upon a gear shift lever, an upright formed with inwardly curved side walls, a cross bar on the upright, the overhanging ends of said bar merging with the side walls of the upright, and an extension on the base surrounding the upright on three sides, said extension being concavo-convex in longitudinal cross section to provide a convenient grip for use independently of the upright.

3. A handle and grip including a base formed for mounting upon a gear shift lever, an upright formed wtih inwardly curved side walls, a cross bar on the upright, the overhanging ends of said bar merging with the said side walls, and an extension on the base, said extension being concavo-convex in longitudinal cross section to provide a convenient grip for use independently of the upright.

JAMES M. ROACHELL.

REFERENCES CITED

The following references are of record in the file of this patent:

UNITED STATES PATENTS

| Number | Name | Date |
|---|---|---|
| 2,161,778 | Hey | June 6, 1939 |
| 2,218,134 | Mohun | Oct. 15, 1940 |